United States Patent

Yasumoto et al.

Patent Number: 4,640,609
Date of Patent: Feb. 3, 1987

[54] LIGHT SOURCE FOR A COLOR ENLARGEMENT

[75] Inventors: Hitoshi Yasumoto, Tondabayashi; Tetsuyuki Tanimoto, Sakai, both of Japan

[73] Assignee: Minolta Camera Kabushiki Kaisha, Osaka, Japan

[21] Appl. No.: 635,814

[22] Filed: Jul. 30, 1984

[30] Foreign Application Priority Data

Aug. 5, 1983 [JP] Japan .................. 58-122436[U]

[51] Int. Cl.⁴ .................................. G03B 27/54
[52] U.S. Cl. ................................. 355/37; 355/70
[58] Field of Search ............. 355/32, 35, 37, 70, 355/71, 67, 113, 112, 43; 354/403

[56] References Cited

U.S. PATENT DOCUMENTS

| | | | |
|---|---|---|---|
| 1,097,211 | 5/1914 | Bechstein | 355/67 |
| 3,322,487 | 5/1967 | Renner | 355/43 |
| 3,334,542 | 8/1967 | Wenthe et al. | 355/70 |
| 3,630,609 | 12/1971 | Clapp et al. | 355/37 |
| 3,716,298 | 2/1973 | Reardon | 355/70 X |
| 4,129,372 | 12/1978 | Allgeier | 355/71 X |
| 4,188,111 | 2/1980 | Marvin | 355/37 |

FOREIGN PATENT DOCUMENTS

| 2209789 | 9/1973 | Fed. Rep. of Germany | 355/37 |
| 7607599 | 1/1978 | Netherlands | 355/37 |

Primary Examiner—L. T. Hix
Assistant Examiner—D. Rutledge
Attorney, Agent, or Firm—Price, Gess & Ubell

[57] ABSTRACT

A light source device for a color enlarger, in which at least three linear light sources are used in order to served as a red light source, a green light source, and a blue light source, respectively, are disclosed. In the device, the linear light source serving as a red light source is arranged perpendicularly to an optical axis of a projection lens in the color enlarger. The other linear light sources serving as green and blue light sources respectively, are arranged perpendicularly to the optical axis and are symmetrical with respect to the optical axis.

16 Claims, 6 Drawing Figures

LIGHT SOURCE FOR A COLOR ENLARGEMENT

BACKGROUND OF THE INVENTION

1. Field of the Invention

The present invention relates to a light source device for a photographic color enlarger and more particularly, to a light-diffusing and color-additive type color enlarger which employs a plurality of linear light sources such as Xenon discharge tubes and which emits red, green and blue lights either sequentially or simultaneously from different light sources, the emitted light being a film to be enlarged via a diffusing plate.

2. Description of the Prior Art

A light source such as the Xenon tube has various advantages in that a small-sized body can emit high-brightness light and that the light source virtually generates no heat and requires no cooling device such as a radiator or cooling-fan, and accordingly the entire light source device including the light source can be made small in size. The assignee of the present application has proposed a light source device for a color enlarger which makes the most of this advantage and employs three flash discharge tubes consisting of Xenon tubes. In the devices, the three Xenon tubes serve as red, green and blue color light sources respectively. The device was designed to provide a required exposure amount and color balance by controlling the number of light emissions of each of the three Xenon tubes and the amount of light to be emitted at each time (hereinafter called the unit amount of light emission). The device is disclosed in a U.S. patent application Ser. No. 527,515 filed on Aug. 9, 1983 and assigned to the same assignee as that of this application.

However, this device was designed such that, to provide a uniform color distribution, each of the three Xenon tubes is spaced from the diffusing plate which serves as a plane light source and that, the light passing through the diffusing plate is led to the original film after being reflected once. Accordingly, the light will be considerably reduced before reaching the film, so that a longer exposure time is required. The reduced light also makes difficult the observation of the image on the easel plane and the focus adjustment when viewing the image. The space between the light sources and the diffusing plate as well as the provision of the reflecting means also mitigates against the compactness of the device.

SUMMARY OF THE INVENTION

An object of the present invention is to provide a light source device for a color enlarger in which the flash discharge tubes are located close to the diffusing plate serving as a plane light source but which provides uniform color distribution.

Another object of the invention is to achieve compactness of the light source device and to provide higher brightness of the plane light source.

To attain those objects, the present invention was made in view of the fact that photographic printing papers have generally spectral sensitivities that are weaker in the order of red, green and blue color lights, and that, especially, sufficient exposure time should be given for the red color light though not as much exposure time is required for the other color lights. The present invention is featured in that the flash discharge tube for emitting the red color light is arranged to intersect, at a right angle, the optical axis of the optical system of the device so as to directly illuminate the diffusing plate that serves as a secondary plane light source. The rest of the flash discharge tubes, i.e. that for emitting the green and blue color light are arranged either in parallel with or perpendicularly to the red color discharge tube and symmetrically with each other with respect to the optical axis.

According to an embodiment of the present invention, a linear light source which is energized substantially continuously for the illumination for focusing, is arranged between the red color flash discharge tube and the diffusing plate as the secondary plane light source to intersect the optical axis at a right angle and to make a right angle at least with the red color flash discharge tube, whereby uniform illumination is given during exposure and a bright image is projected during focusing.

DETAILED DESCRIPTION OF THE PREFERRED EMBODIMENTS

Figure 1:
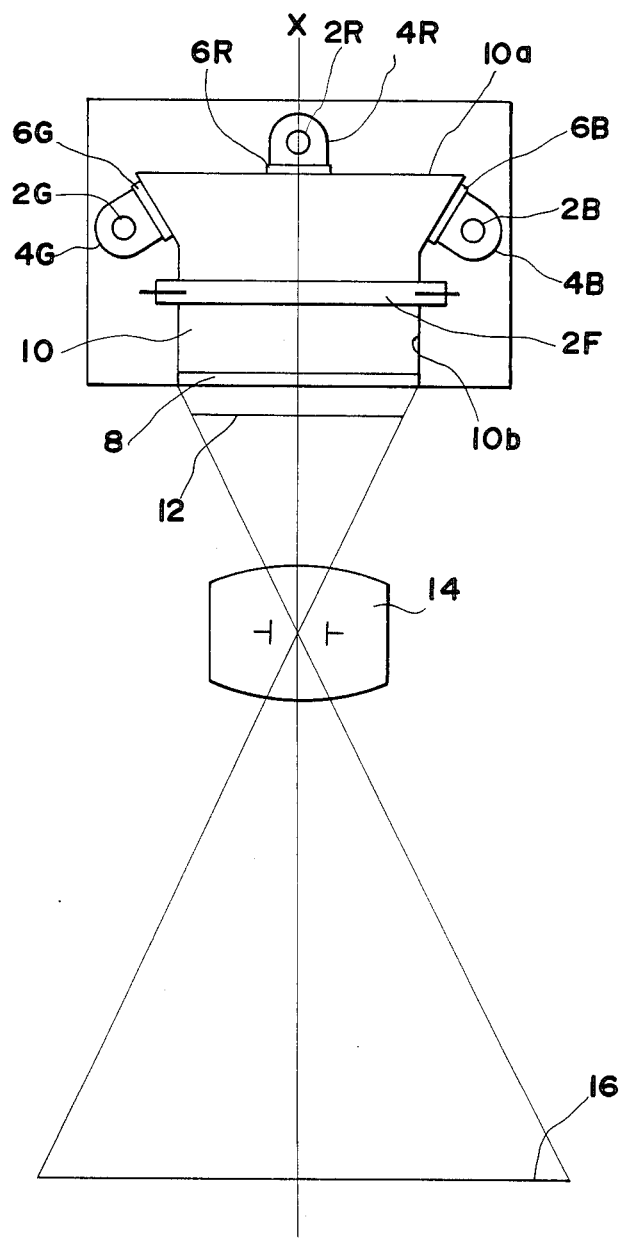
FIG. 1 is a cross sectional view of the optical system of the color additive type enlarger according to a first embodiment of the present invention.

With reference to FIG. 1 showing the outline of the optical system of a color enlarger according to the first embodiment of the present invention, Xenon tubes 2R, 2G and 2B serve as the linear light sources. A red filter 6R, a green filter 6G and a blue filter 6B composed of colored glass filters, dichroic filter or the like are disposed in front of those Xenon tubes respectively for transmitting only red, green and blue light respectively. Xenon tube 2R for the red light is arranged to intersect at a right angle with the optical axis X of the image projecting optical system of the enlarger. Xenon tube 2G for the green light and Xenon tube 2B for the blue light are arranged to be symmetrical with each other with respect to the plane including optical axis X and red light Xenon tube 2R and in parallel with Xenon tube 2R for the red light. Semicylindrical shaped reflectors 4R, 4G and 4B are provided for the Xenon tubes, with the above mentioned filters 6R, 6G and 6B covering the front openings of the reflectors respectively.

As may be clear from the Figure, the light emitted from red light Xenon tube 2R directly illuminates diffusing plate 8 which in turn functions as a secondary plane light source. Green and blue light Xenon tubes 2G and 2B are disposed such that the planes of the openings of reflectors 4G and 4B for them respectively make a predetermined angle with the plane including optical axis X and red light Xenon tube 2R. The lights emitted from Xenon tubes 2G and 2B are diffusively reflected by the upper wall 10a and side wall 10b of diffusing box 10 and then fall on diffusing plate 8. As uniform distribution of illumination can be otained by properly selecting the diffusing reflection characteristics of a diffusive reflecting plane and the angle of projection of a light source, the angles of the planes of the opening of reflectors 4G and 4B may be determined such that the distribution of illumination on easel plane 16 due to the lights emitted from Xenon tubes 2G and 2B is substantially equal to that due to the light emitted from red light Xenon tube 2R.

Also, the entire inside walls of diffusing box 10 except the portions of reflectors 4R, 4G and 4B, such as the inside surfaces of upper wall 10a and side wall 10b are coated with an appropriate white paint to function as the diffusive reflecting plane. Diffusing plate 8 is formed such that the illumination on easel plane 16 will not be lowered at its peripheral portion in comparison with its central portion. For instance, the thickness of the central part of diffusing plate 8 is increased as compared with the peripheral part of the same, or a screened pattern is formed either directly on the diffusing plate or on another member mounted over this plate such that the transmittance reduces towards the center.

On film plane 12 is mounted a negative film photographing an original picture to be printed. Projection lens 14 forms the image of the original picture on easel plane 16 or on a photographic printing paper placed on easel plane 16. Xenon tube 2F illuminates the film on film plane 12 so that the image of the original picture is projected on easel plane 16 by projection lens 14, enabling observation of the focusing condition or the enlarged image and also enabling trimming.

Figure 2:
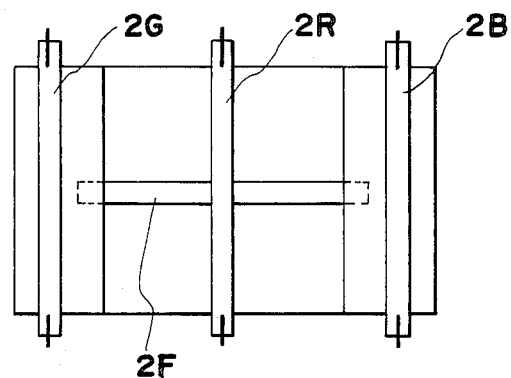
FIG. 2 is a top plane view showing the planar arrangement or layout of the light sources in the embodiment shown in FIG. 1.

As shown in FIG. 2, illumination Xenon tube 2F is arranged to cross at a right angle three Xenon tubes 2R, 2G and 2B and cross optical axis X in such a manner not to affect the distribution of illumination of the lights from Xenon tubes 2R, 2G and 2B. Illumination Xenon tube 2F emits a white color light and is energized by a circuit (not shown) repeatedly at such a high frequency that the light may be regarded as continuous.

With the construction so far described, the light from red light Xenon tube 2R directly illuminates diffusing plate 8, while the lights from green and blue light Xenon tubes 2G and 2B illuminate diffusing plate 8 after they have been reflected by inside walls 10a and 10b and other walls of the diffusing box 10. Diffusing plate 8 thus illuminated then functions as the secondary plane light source and illuminates the film on film plane 12. The light passing through the film is converged by projection lens 14 to form an image either on easel plane 16 or on the photographic printing paper on easel plane 16. As the light from red light Xenon tube 2R directly illuminates diffusing plate 8, the luminous intensity is high on the easel plane for the red light for which the photographic printing paper has a low sensitivity. On the other hand, less uneven color distribution may be obtained for green and blue light because the green and blue lights are diffusively reflected by the inside walls of diffusing box 10. It should be understood that although the illuminunce of the green and blue color lights on the easel plane is decreased a little because these lights emitted from the Xenon tubes reach easel plane 16 after being diffusively reflected, there will be no problem owing to the high sensitivity of the photographic printing paper to the green and blue lights.

Figure 3:
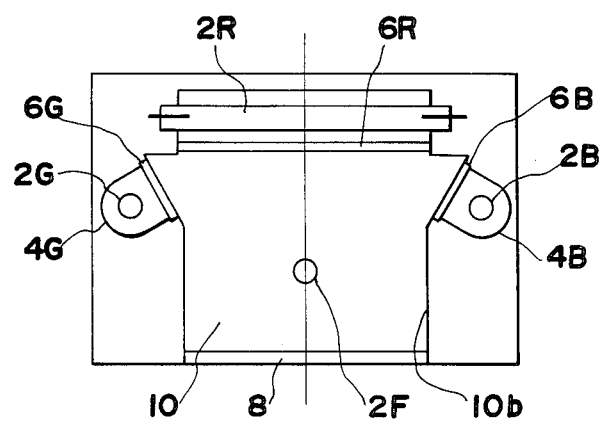
FIG. 3 is a schematic vertical cross-sectional view showing the main portion of a second embodiment of the invention.

FIG. 3 shows an arrangement of the Xenon tubes in a second preferred embodiment of the present invention. The same reference characters are used for the elements corresponding to those of 2. In this embodiment, red light Xenon tube 2R is arranged to make a right angle with optical axis X while green and blue light Xenon tubes 2G and 2B are arranged in parallel with each other and symmetrically with each other with respect to optical axis X, and making a right angle with red light Xenon tube 2R. Xenon tube 2F for the illumination is arranged to cross optical axis X at a right angle and make a right angle with red light Xenon tube 2R. Reflectors 4G and 4B of green light Xenon tube 2G and blue light Xenon tube 2B are arranged such that the planes of their opening respectively make a predetermined angle with the plane including optical axis X and perpendicular to the longitudinal axis of the red light Xenon tube 2R. Accordingly, the light emitted from Xenon tubes 2G and 2B are incident upon diffusing plate 8 after being reflected by the diffusive reflecting plane extending perpendicularly to the plane of the paper of the drawing and being in alignment with the plane of the opening reflector 4R for red light Xenon tube 2R and further reflected by side wall 10b.

Figure 4:
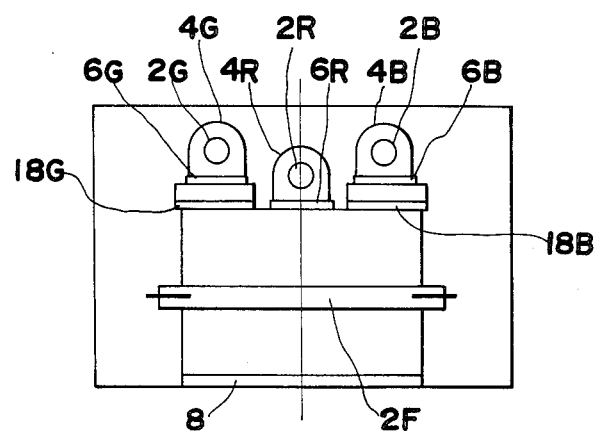
FIG. 4 is a schematic vertical cross-sectional view of the main portion of a third embodiment of the invention.

FIG. 4 shows a third embodiment of the present invention wherein three Xenon tubes 2R, 2G and 2B are arranged in parallel with each other with their reflectors 4R, 4G and 4B being directed downwards. Transmissive diffusing plate 18G and 18B serve to decrease the lights emitted from green light Xenon tube 2G and blue light Xenon tube 2B and balance them with the light emitted from red light Xenon tube 2R, thereby providing appropriate illuminations of the three color lights on the easel plane depending on the color sensitivities of the photographic printing paper. Diffusing plate 18G and 18B also serve to diffuse the green and blue flash lights and minimize the unevenness of the color distribution. Xenon tube 2F for the illumination is arranged to make a right angle with three Xenon tubes 2R, 2G and 2B.

It may be apparent to those skilled in the art that although the Xenon tubes are used as the linear light sources in the above described embodiment the present invention is not limited to the application to a device employing those Xenon tubes, but may be applied to devices employing any other types of light sources in so far as the light sources are linear.

Figure 5:
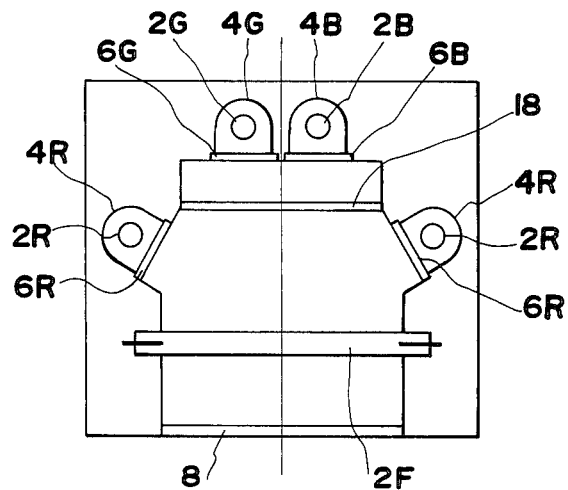
FIGS. 5 and 6 are schematic vertical cross-sectional views showing the main portions of other examples of arrangements of linear light sources.
Figure 6:
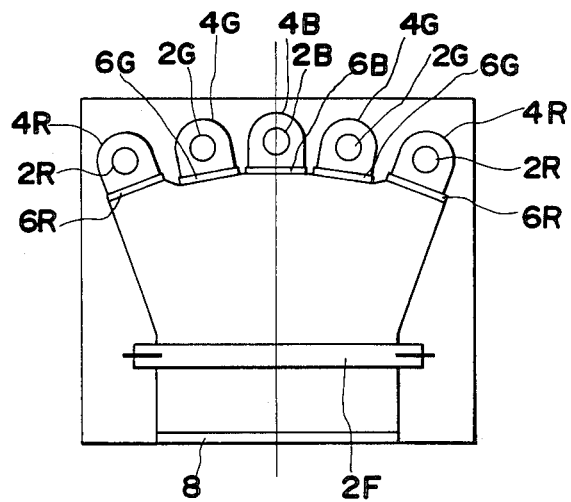

Additionally, although a single Xenon tube is used for each of the red, green and blue light sources in the above described embodiments, a pair of linear red light sources 2R may be arranged as shown in FIGS. 5 and 6 perpendicularly to optical axis X, in parallel with each other and symmetrically with each other with respect to the optical axis X to directly illuminate diffusing plate 8 which serves as a secondary plane light source. In this case, this construction will provide a light source device with a greater brightness and a uniform color distribution. In FIG. 5, transmissive diffusing plates 18G and 18B are disposed in front of the green and blue linear light sources 2G and 2B. FIG. 6 shows another embodiment of the invention wherein two Xenon tubes for each of the red and green light are arranged and there is provided for the blue linear light source a single Xenon tube such that those Xenon tubes 2R, 2G and 2B directly illuminate diffusing plate 8.

According to the present invention as described in the foregoing, a sufficient illumination of the red light is ensured so that the exposure time for each color light can be shortened. At the same time, even more compactness of the light source device is attained. If the illumination light source for the aid of focus detection is arranged to make a right angle with the color light sources which illuminate the diffusing plate serving as a secondary plane light source, and it is positioned closer to the diffusing plate than the color light sources, a bright projected image for the focus adjustment can be obtained without affecting the illumination distribution of the lights emitted from the color light sources.

What is claimed is:

1. A light source device for a color enlarger which includes a projection lens having an optical axis, comprising:
   means for emitting red light toward a film to be enlarged, said red light emitting means including at least a linear light source located perpendicularly to said optical axis;
   means for emitting blue light toward said film, said blue light emitting means including at least a linear light source;
   means for emitting green light toward said film, said green light emitting means including at least a linear light source, the linear light source of said green light emitting means and the linear light source of said blue light emitting means being arranged to be symmetrical with respect to said optical axis and to be in parallel with each other; and
   means for illuminating said film with a substantially constant brightness having a linear light source which is located, in a plane perpendicularly to the optical axis, perpendicularly to the linear light source of said red light emitting means.

2. The invention of claim 1, further comprising means for diffusively reflecting said blue and green light emitted from said blue and green light emitting means toward said film.

3. The invention of claim 2, further comprising means for integrally holding said red, blue and green light emitting means and having an interior surface facing said blue and green light emitting means, and wherein said diffusively reflecting means are located on said interior surface.

4. The invention of claim 2, further comprising means for diffusively transmitting the red, blue and green light emitted from said red, blue and green light emitting means in order to illuminate the film with flat brightness distribution.

5. The invention of claim 1, wherein the linear light source of said blue and green light emitting means are arranged to be perpendicular to the linear light source of said red light emitting means.

6. The invention of claim 1, wherein the linear light sources of said blue and green light emitting means are arranged in parallel with the linear light source of said red light emitting means.

7. The invention of claim 1, further comprising means for diffusively transmitting the blue and green light emitted from said blue and green light emitting means, said diffusively transmitting means being located in front of said blue and green light emitting means.

8. The invention of claim 1, wherein said red light emitting means includes a linear flash discharge tube and means for transmitting only a red light component of light emitted from said linear flash discharge tube, wherein said blue light emitting means includes a linear flash discharge tube and means for transmitting only a blue light component of light emitted from said linear discharge tube, and wherein said green light emitting means includes a linear flash discharge tube and means for transmitting only a green light component of light emitted from said linear flash discharge tube.

9. The invention of claim 1, wherein the linear light source of said illuminating means is arranged perpendicularly to the linear light source of said red light emitting means and to said optical axis.

10. The invention of claim 9, wherein the linear light source of said illuminating means includes a linear flash discharge tube.

11. The invention of claim 9, further comprising means for diffusively transmitting the red, blue and green light emitted from said red, blue and green light emitting means in order to illuminate the film with a flat brightness distribution, and wherein the linear light source of said illuminating means is located between said diffusively transmitting device and said red, blue and green light emitting means.

12. A light source device for a color enlarger which includes a projection lens having an optical axis and a diffusion plate functioning as a plane light source, comprising:
   means for emitting red light directly toward said diffusion plate, said red light emitting means including a linear light source arranged perpendicularly to said optical axis;
   means, including a linear light source, for emitting blue light;
   means including a linear light source, for emitting green light;
   means for diffusely reflecting said blue and green light towards said diffusion plate; and
   means for illuminating said diffusion plate having a linear white light source which is located, in a plane perpendicularly to the optical axis, perpendicularly to the linear light source of said red light emitting means, and which is positioned between the linear light source of said red light emitting means and said diffusion plate.

13. The invention of claim 12, wherein the linear light sources of said blue and green light emitting means are arranged to be parallel with each other and to be symmetrical with respect to said optical axis.

14. The invention of claim 13, wherein the linear light source of said illuminating means is arranged perpendicularly to said optical axis.

15. A light source device for a color enlarger which includes a projection lens having an optical axis and a diffusion plate serving as a plane light source, comprising:
   means for emitting red light toward said diffusion plate, said red light emitting means including a pair of linear light sources located parallel with each other, said pair of linear light sources being arranged to be symmetrical with respect to said optical axis and to be perpendicular to said optical axis;
   means for emitting green light toward said diffusion plate, said green light emitting means including a pair of linear light sources located parallel with each other, said pair of linear light sources being arranged to be symmetrical with respect to said optical axis and to be perpendicular to said optical axis;
   means for emitting blue light towards said diffusion plate, said blue light emitting means including a linear light source located on and perpendicularly to said optical axis; and means for illuminating said diffusion plate, said illuminating means including a linear white light source located between said red light emitting means and said diffusion plate, in a plane perpendicularly to the optical axis, and perpendicularly to the pair of linear light sources of said red light emitting means.

16. The invention of claim 15, wherein the pair of linear light sources of said red light emitting means, the pair of linear light sources of said green light emitting means, and the linear light source of said blue light emitting means are arranged to be substantially parallel with each other.

* * * * *

UNITED STATES PATENT OFFICE
CERTIFICATE OF CORRECTION

Patent No. 4,640,609          Dated February 3, 1987

Inventor(s) Hidetoshi Yasumoto et al.

It is certified that error appears in the above-identified patent and that said Letters Patent are hereby corrected as shown below:

In the name of the first inventor, delete "Hitoshi Yasumoto" and insert --Hidetoshi Yasumoto--.

Signed and Sealed this

Sixth Day of October, 1987

Attest:

DONALD J. QUIGG

Attesting Officer     Commissioner of Patents and Trademarks